US012591619B2

(12) United States Patent
Ambwani et al.

(10) Patent No.: US 12,591,619 B2
(45) Date of Patent: *Mar. 31, 2026

(54) CONTENT DESCRIPTOR

(71) Applicant: Comcast Cable Communications, LLC, Philadelphia, PA (US)

(72) Inventors: Geetu Ambwani, Washington, DC (US); Robert Rubinoff, Potomac, MD (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 488 days.

This patent is subject to a terminal disclaimer.

(21) Appl. No.: 18/331,617

(22) Filed: Jun. 8, 2023

(65) Prior Publication Data

US 2023/0325439 A1    Oct. 12, 2023

Related U.S. Application Data

(63) Continuation of application No. 17/474,609, filed on Sep. 14, 2021, now Pat. No. 11,714,852, which is a
(Continued)

(51) Int. Cl.
*G06V 20/40*        (2022.01)
*G06F 16/58*        (2019.01)
(Continued)

(52) U.S. Cl.
CPC ...... *G06F 16/7867* (2019.01); *G06F 16/5846* (2019.01); *G06F 16/5866* (2019.01);
(Continued)

(58) Field of Classification Search
None
See application file for complete search history.

(56) References Cited

U.S. PATENT DOCUMENTS 6,473,778 B1    10/2002    Gibbon
9,069,850 B2    6/2015    Ambwani et al.
(Continued)

FOREIGN PATENT DOCUMENTS

WO        2004/043067 A2    5/2004

OTHER PUBLICATIONS

European Search Report—EP 12191800—Mailing date: Jun. 28, 2013.
(Continued)

*Primary Examiner* — Bernard Krasnic
(74) *Attorney, Agent, or Firm* — Banner & Witcoff, Ltd.

(57) ABSTRACT
An apparatus, method, system and computer-readable medium are provided for generating one or more descriptors that may potentially be associated with content, such as video or a segment of video. In some embodiments, a teaser for the content may be identified based on contextual similarity between words and/or phrases in the segment and one or more other segments, such as a previous segment. Text/characters may serve as a candidate descriptor(s). In some embodiments, one or more strings of characters or words may be compared with (pre-assigned) tags associated with the content, and if it is determined that the one or more strings or words match the tags within a threshold, the one or more strings or words may serve as a candidate descriptor(s). One or more candidate descriptor identification techniques may be combined.

20 Claims, 7 Drawing Sheets

Related U.S. Application Data continuation of application No. 14/719,652, filed on May 22, 2015, now Pat. No. 11,151,193, which is a continuation of application No. 13/291,154, filed on Nov. 8, 2011, now Pat. No. 9,069,850.

(51) Int. Cl.

| | |
|---|---|
| *G06F 16/583* | (2019.01) |
| *G06F 16/78* | (2019.01) |
| *G06F 16/783* | (2019.01) |
| *G06F 16/951* | (2019.01) |
| *G06V 30/10* | (2022.01) |

(52) U.S. Cl.
CPC ........ *G06F 16/7844* (2019.01); *G06F 16/951* (2019.01); *G06V 20/47* (2022.01); *G06V 30/10* (2022.01)

(56) References Cited

U.S. PATENT DOCUMENTS

| | | | |
|---|---|---|---|
| 11,151,193 B2 | 10/2021 | Ambwani et al. | |
| 11,714,852 B2 * | 8/2023 | Ambwani ........... | G06F 16/5846 382/176 |
| 2003/0050926 A1 | 3/2003 | Agnihotri et al. | |
| 2004/0078749 A1 | 4/2004 | Hull et al. | |
| 2008/0027983 A1 | 1/2008 | Erol et al. | |
| 2009/0041356 A1 | 2/2009 | Barbieri et al. | |
| 2009/0150947 A1 | 6/2009 | Soderstrom | |
| 2011/0264700 A1 | 10/2011 | Mei et al. | |
| 2012/0269441 A1 | 10/2012 | Marchesotti et al. | |
| 2012/0303643 A1 | 11/2012 | Lau | |
| 2013/0124203 A1 | 5/2013 | Scoggins, II et al. | |

OTHER PUBLICATIONS

Shu-Sheng Hao: "Image Features Extraction for Multimedia Database Content Description", Computer and Information Science, 2006. ICIS-COMSAR 2006. 5th IEEE/ACI International Conference on Honolulu, HI, USA Jul. 10-12, 2006, Piscataway, NJ, USA, IEEE, Jul. 10, 2006 (Jul. 10, 2006), pp. 327-332, XP010928894.
Guil N et al: "Automatic Analysis of the Content of Cell Biological Videos and Database Organization of Their Metadata Descriptors", IEEE Transactions on Multimedia, IEEE Service Center, Piscataway, NJ, US, vol. 6, No. 1, Feb. 1, 2004 (Feb. 1, 2004), pp. 119-128, XP011105810.
David Zajic, "BBN/UMD at DUC-2004: Topiary", 2004.
Aug. 8, 2017—(EP) Office Action—App. No. 12191800.7.
Sep. 17, 2018—Canadian Office Action—CA 2,794,901.

* cited by examiner

CONTENT DESCRIPTOR

CROSS-REFERENCE TO RELATED APPLICATIONS

This application is a continuation of and claims priority to U.S. patent application Ser. No. 17/474,609, filed Sep. 14, 2021, which is a continuation of U.S. patent application Ser. No. 14/719,652, filed May 22, 2015 (now U.S. Pat. No. 11,151,193), which is a continuation of U.S. patent application Ser. No. 13/291,154, filed Nov. 8, 2011 (now U.S. Pat. No. 9,069,850), each of which is hereby incorporated by reference in its entirety.

BACKGROUND

With the advent of social media and distribution of content via networks such as the Internet, users have access to innumerable pieces of content. For example, websites (e.g., commercial websites) may provide access to videos that are uploaded by users, thereby allowing users to reach larger audiences with their content, and allowing users to access thousands and thousands of videos. To help users find videos of interest, a creator of the video may define one or more keyword tags to accompany the video and give prospective viewers some information on what the video contains.

A tag may be one or more words that identify the content of a particular program segment (e.g., the keyword "peanut" for a news story about peanut farmers), and may provide a user with the ability to determine what the subject of the video is and whether the video is of interest. Unfortunately, it may be difficult for a user to distinguish videos. For example, tags are frequently inaccurate, and uploaders often choose ambiguous terms to describe videos. As a result, a user looking for a video on a particular topic or subject of interest may have to sift through, or watch, a large number of videos that are not of interest. This disclosure identifies and addresses shortcomings related to an increasing number of content items, such as videos, that become available. There is an ever-present need to improve a user's ability to quickly find content of interest.

SUMMARY

This summary is not intended to identify critical or essential features of the disclosure provided herein, but instead merely summarizes certain features and variations thereof.

In some illustrative embodiments, content (e.g., a video) may be divided up, or fragmented, into one or more segments. Segments may be, for example, time-based portions of a program, such as the first 5 minutes of a show, or the portion between the $2^{nd}$ and $3^{rd}$ commercial breaks, etc. Boundaries for the various segments may be based on criteria, such as topical coherence criteria. The segments may have different start and/or end times.

In one aspect, a descriptor may be applied to, or associated with, the content, such as one or more segments of the content. A descriptor may include one or more characters. For example, a descriptor may include one or more words or phrases, such as one or more sentences. In some embodiments, a descriptor may include audio or other types of data. The audio may be played in response to a user selection of the descriptor. For example, in some embodiments the descriptor may be presented as a selectable item, such as a link, a button, or the like.

A generation of a descriptor may be based on any number of inputs, factors, or conditions. For example, in some illustrative embodiments, a descriptor may be generated based at least in part on an identification of a teaser. In some embodiments, the teaser may include material in a first segment that is representative of material in a second segment. In some embodiments, the second segment may be different from the first segment. In some embodiments, the second segment may be earlier in time or later in time relative to the first segment. In some embodiments, similarity techniques may be used to determine whether material in a particular segment qualifies as a teaser.

In some illustrative embodiments, a descriptor may be generated based at least in part on an optical character recognition (OCR) technique. For example, text or characters associated with graphics, banners, or the like included in a segment may be OCR'd and compared with one or more tags assigned to the segment. When a match exists beyond a threshold, the text or characters may serve as a descriptor.

In some illustrative embodiments, a descriptor may be generated based at least in part on the use of a salient text detection. For example, words, terms, or phrases in a transcript (e.g., a closed caption transcript) associated with a segment may be compared with one or more tags assigned to the segment. When a match exists beyond a threshold, the words, terms, or phrases may serve as a descriptor.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Various connections between elements are discussed in the following description. These connections are general and, unless specified otherwise, may be for example direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
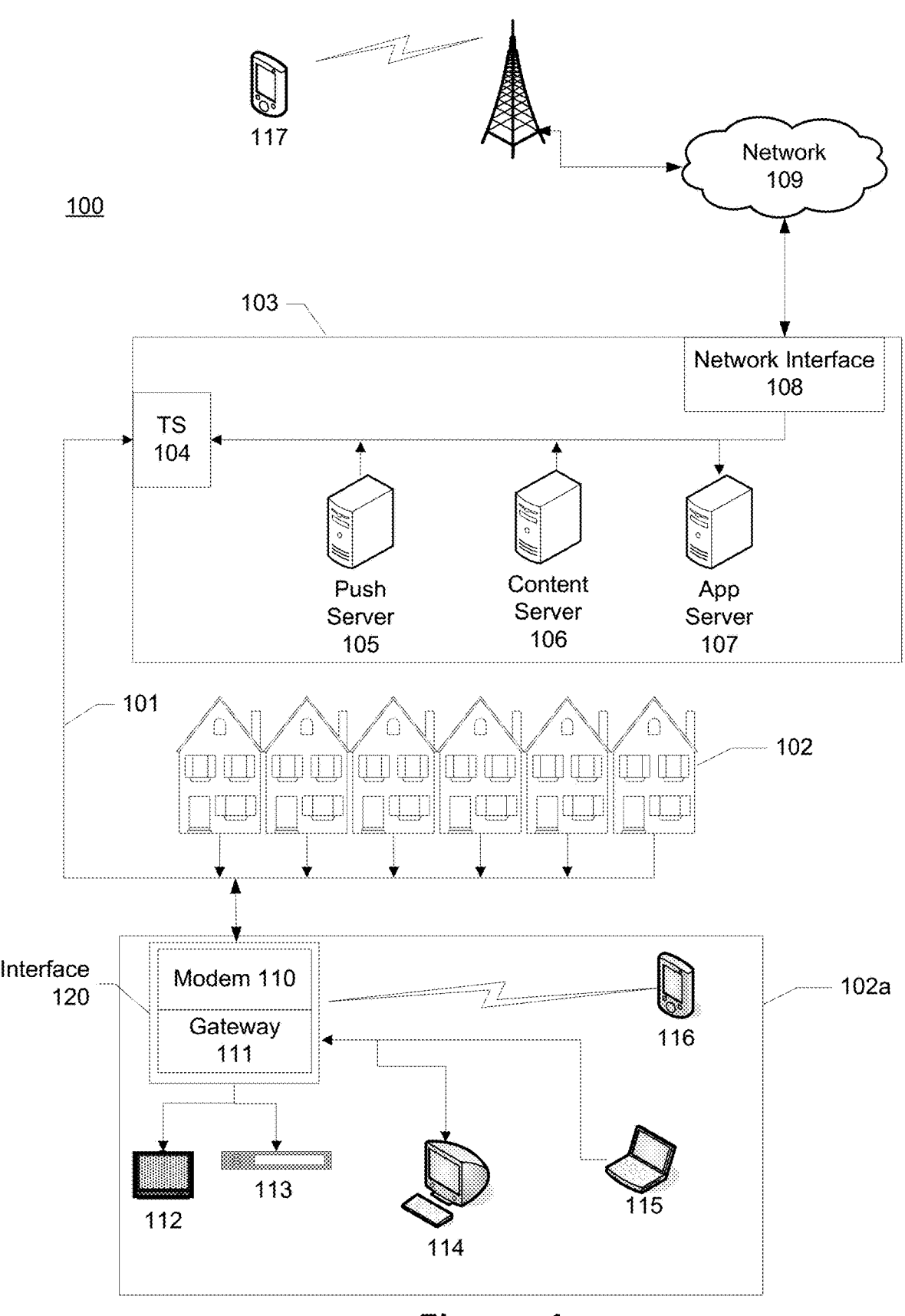
FIG. 1 illustrates an example network.

FIG. 1 illustrates an example network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include a termination system (TS) 104, such as a cable modem termination system (CMTS), which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. CableLabs), or it may be a similar or modified device instead. The termination system (TS) may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones 117.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An example premises 102a may include an interface 120. The interface 120 may comprise, in one aspect, a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the premises 102a to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the premises 102a, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
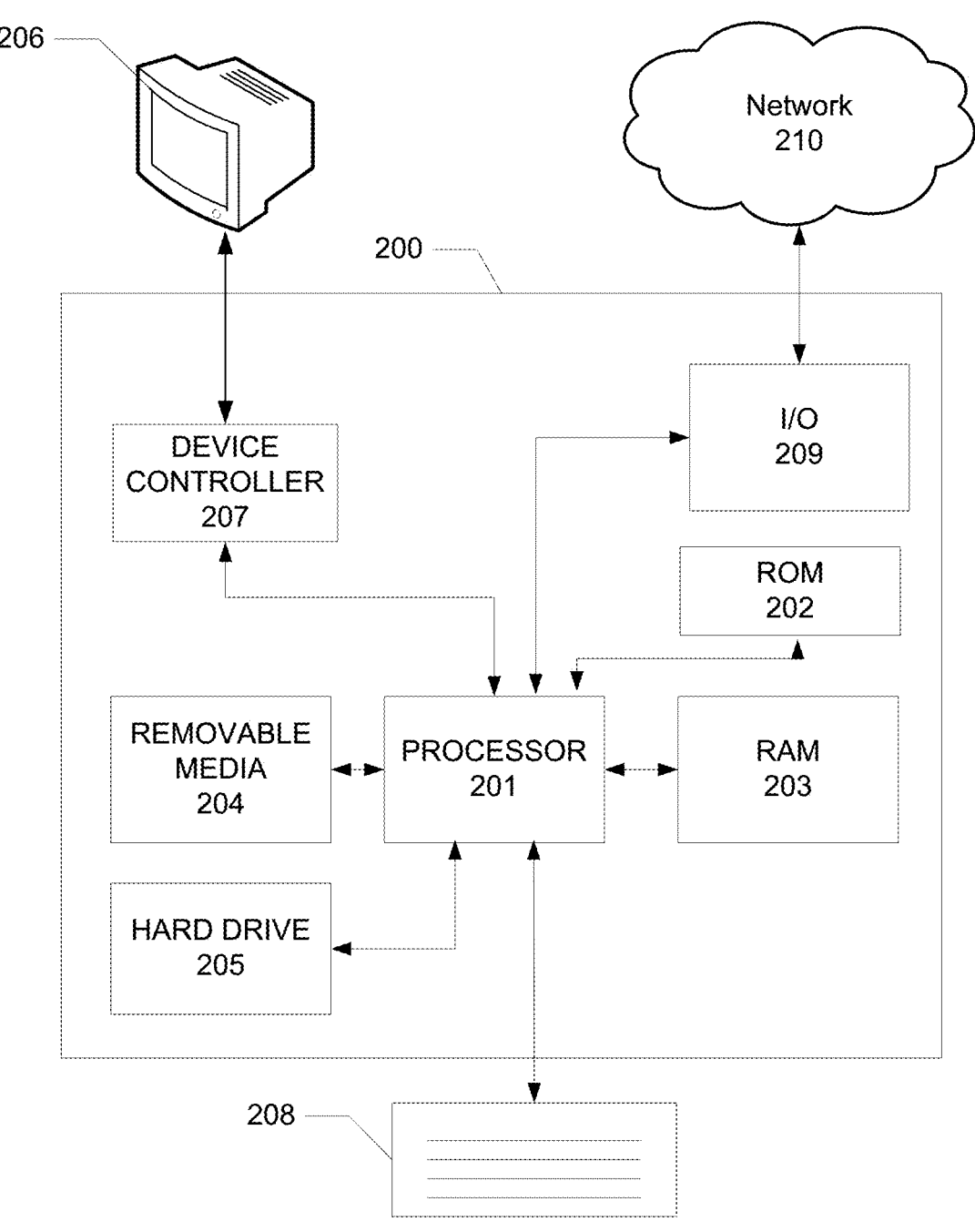
FIG. 2 illustrates an example platform on which the various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Aspects of this disclosure may be implemented to generate and apply one or more descriptors to one or more segments of content. For purposes of illustrative simplicity and consistency, the content is described as including video (e.g., video clips associated with a news program). The techniques described herein can be adapted and applied to other forms or types of content, such as text files, audio (e.g., music), etc.

Figure 3:
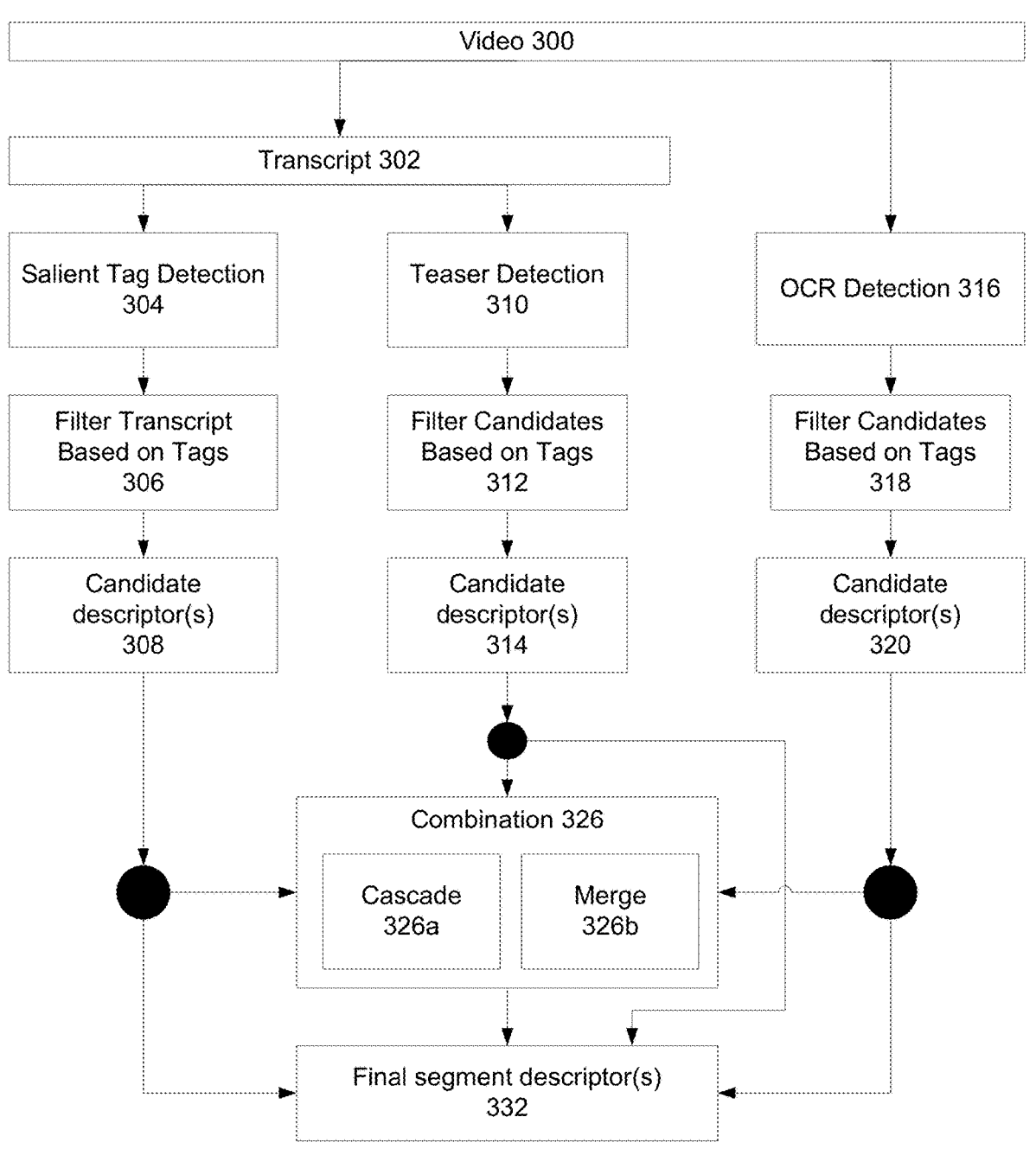
FIG. 3 illustrates an example flow diagram demonstrating one or more aspects of this disclosure.

FIG. 3 illustrates a flow diagram suitable for demonstrating one or more aspects of this disclosure. In some embodiments, the various blocks shown in FIG. 3 may be included in, associated with, or executed in accordance with one or more of the components and devices described above in connection with FIGS. 1-2. The flow diagram of FIG. 3 may be used to generate (e.g., automatically generate) one or more descriptors for one or more segments of data, such as segments of video. The one or more segments of video might not have a descriptor associated with them yet, or might only have a few tags that may be elaborated on.

The flow diagram of FIG. 3 may follow steps where a video 300 (e.g., a nightly news program) has been broken down into time-based segments (e.g., segments separated by commercial breaks). The video 300 may be obtained from one or more sources, such as one or more network or content providers, and the source(s) may provide information indicating where the segments begin and end. The source(s) may also supply one or more tags describing the segments. For example, keyphrase extraction may be used by the source(s) to generate the one or more tags, and the keyphrase extraction may be based at least in part on statistics (e.g., frequency of occurrence of a given word in a segment). One skilled in the art would understand how to segment and generate and apply tags for/to a video, and as such, a further description of these techniques is omitted from this disclosure for the sake of brevity.

As shown in FIG. 3, a transcript 302 (or any descriptive file describing the program and/or its segments) may also be obtained or received for the video 300 and its segments. The transcript may be based, for example, on one or more closed captioning processes. The transcript may include a textual transcription of spoken or audible words or phrases that are heard during the video and its segments.

The transcript 302 may be processed by one or more techniques to identify portions of the transcript (e.g., a spoken sentence or phrase) that can serve as proposed descriptions (e.g., descriptors) for each segment in the video. Three descriptor generation techniques are shown in FIG. 3: salient tag detection 304, teaser detection 310, and OCR detection 316. These techniques are exemplary and other types of techniques may be used. These techniques may each process the data segments, such as segments of a program (e.g., the teaser detection 310 and salient tag detection 304 may process the transcript, while the OCR detection 316 may process the video images contained in the video segments, or vice versa), and may each provide one or more candidate descriptors for a given segment. For example, candidate descriptor(s) 308, 314 and 320 may generate one or more candidate descriptors in some embodiments. These candidates may then be processed together to select one or more that will serve as the descriptor for the given segment.

Beginning with the salient tag detection 304, the transcript may be processed to identify one or more keywords or tags for each segment in the program. As noted above, these keywords or tags may be supplied by the content source, and they may be generated using any desired keyphrase extraction technique. The resulting set of keywords or tags may then be used in step 306 to filter the transcript's sentences. In this filtering, the contextual relationship strength between the tags and each candidate descriptor may be determined. For example, a candidate descriptor may contain a plurality of words in a portion of the program, and each of those words can be compared against each of the tags or keywords. This comparison can be made against an overall contextual database that lists, for each word in the database, one or more other words that have been determined to be contextually related, with a relationship strength for each listed word. So, for example, the word "dog" may have an entry that lists the words "leash" and "park", since dogs are often contextually related to leashes and parks. The relationship strength value for "leash" may be higher (stronger) than "park," though, since discussions using the term "leash" will almost always also refer to a dog, and since discussions using the term "park" will sometimes relate to dogs, but will often have nothing to do with dogs. So while the dog's entry for "leash" may have a high value (e.g., 90), the dog's entry for "park" may be lower (e.g., 40).

In step 306, the tags found in salient tag detection 304 may be compared with each of the terms in the transcript, and the terms (or phrases) that have a contextual match exceeding a predetermined minimum strength level may be identified as candidate descriptors 308. In some embodiments, the filtering can be conducted on a per-sentence basis, such that individual strength values for words or phrases in a single sentence are combined and collectively compared to the minimum strength level. Sentences meeting or exceeding the minimum strength value may then be provided as candidate descriptors 308 for the segments in which they appear.

A second algorithm for identifying candidate descriptors can involve teaser detection 310. Teaser detection 310 may be used to determine whether an earlier program segment contains a teaser or a trailer that describes a later segment. An example teaser can be found in some news programs, when a news anchor gives a short summary, prior to a commercial break, of a news item that will be addressed following the commercial break (e.g., "Stay tuned after the break, and we will tell you about something in your house that may be killing you."). The last sentence of the earlier segment ("something in your house that may be killing you"), may contain a helpful description of the content in the later segment (just after the commercial break). To determine whether an earlier segment contains a teaser for a later segment, words, terms, or phrases included in an earlier segment of video may be compared with one or more words, terms, or phrases from the later segment of the video to determine whether one or more words, terms, or phrases are contextually related to, or descriptive of, the words, terms, or phrases included in the second segment.

For example, if a given segment of a program contains lines 100-150 of the transcript, the teaser detection 310 may process some or all of the preceding sentences in the transcript (e.g., sentences 1-99) to determine if any of those earlier sentences could be teasers for the given segment. To do so, the teaser detection 310 algorithm can process each of the earlier sentences (e.g., sentences 1-99), and identify the contextual relationship strength between the words in those earlier sentences with the words in the given segment's sentences (e.g., identify the contextual relationship strength of each of sentences 1-99 with sentences 100-150). This may result in a sentence relationship strength score for each of the earlier sentences 1-99, identifying how contextually related those sentences are to the given segment and its sentences 100-150. One or more of the earlier sentences whose relationship strength exceeds a predetermined minimum may be selected as possible descriptors for the given segment.

The earlier sentence's relationship strength need not be the only factor in determining whether an earlier sentence is a possible teaser for the later given segment. Another factor may be the contextual relationship that the earlier sentence has with its neighboring sentences in the earlier segment of the program, and the relevance interval of the sentence in the earlier segment. Stated differently, a teaser sentence often will be unrelated to nearby sentences, or will only be related to a small number of nearby sentences. If a sentence is related to a large number of nearby sentences, then it is less likely that the sentence was actually a teaser for a different segment. So, for example, if sentence 64 had a strong match to the segment in sentences 100-150, but sentence 64 is also closely related to sentences 35-65, then it is less likely that sentence 64 was truly a teaser for sentences 100-150. In that situation, the match between sentence 64 and sentences 100-150 may have been just a coincidence. On the other hand, if sentence 64 was only closely related to one or two nearby sentences (e.g., sentences 63-66), then sentence 64 is more likely to have been a teaser for the sentences 100-150 that it matched. In this proximity analysis, the teaser detection algorithm may use a maximum relevance interval (e.g., a candidate teaser sentence can only be closely related to 6 nearby sentences, and if it is closely related to more than 6, then discard it as a candidate teaser) and a proximity relevance strength minimum (e.g., a sentence is "closely" related to a neighboring sentence if the total relationship strength between the words in the two sentences exceeds an average strength of 90).

As another factor, the position of the earlier sentences within their own segments may be taken into consideration in determining whether they are possible teaser sentences. For example, if an earlier sentence is close to the end of its respective segment, then it is more likely to be a teaser for the following segment. To make this determination, the teaser detection 310 may establish a distance value from the end of the segment (e.g., 2 sentences from the end of the earlier segment), and possible teaser sentences that are within that distance value of the end of the segment may be deemed more likely to be a teaser sentence. In some embodiments, the various factors above can serve to increase or decrease a value indicating the likelihood that a particular earlier sentence is a teaser for a later segment. For example, and as described above, in some embodiments it may be more likely for a teaser to be located just before (or within a threshold distance in terms of number of words, terms, or phrases before) a commercial break (e.g., in order to capture a viewing audience's interest or prompt the audience to continue watching the program after the commercial break has ended). For example, if a first segment is being examined as a potential or candidate teaser for a second segment, and a commercial break resides in between the first and second segments, the last 'n' sentences of the first segment may be examined or the last 'z' seconds of the first segment may be examined, where 'n' and 'z' are numbers, such as 2 and 10, respectively. A word, term, or phrase from the first segment located towards the end of the first segment and just prior to a commercial break may receive added weight as a candidate teaser relative to another word, term, or phrase from the first segment located towards the beginning or middle of the first segment and further from the commercial break.

This discussion above has assumed that teaser sentences for a given segment can only occur in earlier sentences in the program. For example, in a newscast, a news anchor may preview or foreshadow a topic that is going to be discussed in greater detail during a future portion of the program (where the future portion of the program corresponds to the second segment) at a current point in time during the program (where the current point in time corresponds to the first segment). In other embodiments, a teaser sentence for a given segment can occur later in the program, such as in a recap segment at the end of a news program, where the recap provides a short summary of an earlier story that was discussed in the program.

The teaser detection 310 may result in a number of earlier sentences identified as possible teasers for the later segment. In step 312, those candidate teaser sentences can be filtered using the tags detected in the salient tag detection 304. The contextual relationship strength between each candidate teaser sentence (or the words in the sentence) and the tags for the later segment may be compared against a predetermined minimum strength value, and sentences that do not have a strong enough relationship to the tags may be filtered out. The remaining candidate teasers can then be supplied as candidate descriptors 314.

A third process, e.g., optical character recognition (OCR) detection 316 may be used to generate a set of descriptor candidates based on text, graphics, and/or banners appearing in an image portion of a given segment. In this OCR detection 316, the onscreen images of a given segment may be analyzed with OCR of words and phrases appearing on screen during that segment. This may be useful in identifying descriptors since some programs may run a textual banner on the screen in conjunction with the transmission (e.g., the broadcast, multicast, unicast, etc.) of the segment (e.g., a news story about a local sports team may have a banner across the bottom saying "Local Team Wins City Championship").

In some embodiments, the filtering of the OCR text/characters may be based at least in part on restricting the OCR text/characters to a subset of banners or graphics associated with the segment. For example, the OCR text/characters may be restricted to the first 'Y' banners/graphics appearing in the segment, where 'Y' may be a number. In some embodiments, the restriction imposed with respect to the 'Y' banners/graphics appearing in the segment may be offset relative to another position (e.g., the start) of the segment. For example, if 'Y' is equal to six, and an offset of three is desired relative to the start of the segment, then the OCR text/characters may be restricted to the fourth through ninth banners/graphics appearing in the segment.

In some embodiments, knowledge of the program or segment may be used to identify a set of candidate descriptors. For example, the Pardon The Interruption (PTI) program on ESPN may include a set of topic banners located on screen, where the current topic is highlighted and upcoming/future topics that are to be discussed are shown but not highlighted. Knowledge of the structure and highlighting used in connection with the topic banners may facilitate selection of the topic banners as descriptors of a given segment of the program.

The OCR detection 316 for a given segment may intentionally ignore onscreen text that appears at the very beginning or very end of the segment (e.g., in the first or last 3 seconds), since it is possible that such onscreen text actually belongs to a neighboring segment in the program. For this purpose, an end- or beginning-buffer time period may be used to define how much of the beginning and/or end of the segment should be ignored before conducting the OCR detection 316.

The OCR detection 316 may result in a number of potential OCR descriptors, and these may be compared 318 against tags assigned to the given segment to facilitate the comparison. The use of a comparison between the OCR text/characters and the tags may help to eliminate or filter-out OCR text that is off-topic. For example, in the context of a news program, banners or graphics that may be present may change slowly between segments, such that a banner or graphic that is present in a given segment may, at least for a short time (which may be evaluated against a predetermined threshold amount of time), be representative of the previous segment. Comparing the OCR text/characters to the tags may help to ensure that OCR text/characters indicative of a prior segment are not considered as a candidate descriptor of the given segment. If it is determined that the OCR text/characters do not match the tags based on the comparison, the OCR text/characters may be ignored or discarded as a possible descriptor. On the other hand, if it is determined that the OCR text/characters match one or more tags based on the comparison, the OCR text/characters may be retained as a possible descriptor.

The OCR text/characters generated by OCR detection 316 (potentially less any text/characters that may be excluded by filtering as described above) may be provided to candidate descriptor(s) 320.

In some embodiments, variations on the foregoing descriptor generation techniques may be used. For example, in some embodiments, OCR text or characters may be examined for a match with portions of transcript 302 or one or more words, terms, or phrases included in a segment (by, e.g., OCR detection 316), and if a match is found, the process may end. On the other hand, if a match is not found using the OCR text or characters (or if the number of matches is less than some specified number), the transcript 302 or the one or more words, terms, or phrases may be compared (by, e.g., salient tag detection 304) to tags assigned to the segment.

The descriptor generation techniques may be evaluated based on a variety of terms or measures. For example, the descriptor generation techniques may be evaluated in terms of: (1) precision, or a measure of the accuracy or quality of descriptors assigned relative to segments that have been assigned descriptors, (2) recall, or a measure of the accuracy or quality of descriptors assigned relative to all (or a subset of) the segments, (3) an F-score, or a combination of precision and recall, and/or (4) coverage, or the number of segments that are assigned a descriptor relative to all (or a subset of) the segments. As skilled artisans would appreciate, an F-score may be based on a weighted average of precision and recall. The F-score may adhere to a formula of the form $(2*P*R)/(P+R)$, where 'P' reflects precision and 'R' reflects recall. In some embodiments, a weighting of precision relative to recall in the formula may be used to give importance or priority to precision relative to recall (or vice versa).

In some embodiments, the two main measures taken into consideration may be precision and coverage. Frequently, a tradeoff may need to be made between precision and coverage. For example, in order to increase coverage, it may be necessary to reduce precision. Conversely, in order to increase precision, it may be necessary to reduce coverage. The choice of how to weight precision relative to coverage may be based on product or service considerations, or stated in a slightly different way, how one values precision relative to coverage.

In terms of evaluating precision, or more generally the quality or accuracy of a descriptor assigned to a segment, a poll or survey of users may be conducted. The users may be asked to provide feedback as to the quality of the assigned descriptor (e.g., based on some scale, such as a scale providing options of "good", "fair", or "poor" for selection). The poll/survey may then be repeated for a relatively large number of segments (e.g., ninety segments) and descriptors, where the corpus of segments may be selected to be indicative of the types of videos to be assigned descriptors going forward. In this manner, the performance of the descriptor generation techniques can be measured or evaluated relative to one another, and adjustments can be made to achieve any number of objectives, such as maximizing one or more of precision and coverage (or a combination thereof). In some embodiments, the measurement or evaluation that may be performed may be adjusted, tailored, or modified based on the type of program or segment that is being examined. For example, an evaluation may be undertaken to determine what algorithm (or combination(s) of algorithms) generate the best results for different types of programs or segments. The determined algorithm(s) may then be applied to future segments of that same type.

While discussed above as separate descriptor generation techniques, in some embodiments features from two or more of the descriptor generation techniques may be combined. For example, a high-precision, low-coverage descriptor generation technique may be combined with a lower-precision, higher-coverage descriptor generation technique in an effort to increase coverage while only obtaining slightly lower-precision. Referring to FIG. 3, two combination techniques 326 are illustrated: cascade 326a and merge 326b.

In the cascade technique 326a, the candidates from one or more descriptor generation techniques may be examined in turn based on a predetermined ordering or sequence of the descriptor generation techniques. In some embodiments, the sequence or ordering of the examination performed via the cascade technique 326a may vary, or be a function of, the type of program or segment that is being considered. The examination associated with cascade technique 326a may stop or cease once a predetermined number of descriptors (e.g., a predetermined number of sentences or snippets) is/are found, or the process runs out descriptor generation techniques (e.g., no more descriptor generation techniques are available). In the merge technique 326b, all (or a subset of) the candidates generated by the one or more descriptor generation techniques may be examined together as descriptors for a segment.

All other things being equal, the merge technique 326b will have equal or higher precision than the cascade technique 326a because the merge technique 326b will include the descriptor(s) resulting from the cascade approach. All other things being equal, the merge technique 326b will utilize the same amount or a greater number of processing resources relative to the cascade technique 326a, at least insofar as the merge technique 326b will present an equal or larger set of candidate descriptors to an editor for selection. Thus, in some embodiments where one of the combination techniques is being considered, a tradeoff may be made between precision and processing resources.

In some embodiments, combination technique 326 may include techniques other than cascade 326a and/or merge 326*b*. For example, combination technique 326 may simply pass or transmit one or more candidate descriptors received from 308, 314 and/or 320.

The results or candidate descriptors may be presented to a user (e.g., an editor) as final segment descriptor(s) 332. The user may correct spelling errors, capitalization or the like, which may be a partial result of an error in transcript 302. The user may also assess the accuracy or precision of the final descriptor(s) 332 and may select one or more of the descriptor(s) (possibly after modification or refinement by the user) to be assigned to the segment under consideration. In some embodiments, if no candidate descriptor is generated, or if all the candidate descriptors are deemed to be of low quality by the user, the user may take one or more actions, including: (1) writing his/her own descriptor for the segment, (2) not assigning any descriptor to the segment, and/or (3) using any available tags as the descriptor.

As shown in the flow of FIG. 3, in some embodiments one or more of candidate descriptors 308, 314, and 320 may directly feed or provide input to final segment descriptor(s) 332. For example, in embodiments where only one of salient tag detection 304, teaser detection 310, and OCR detection 316 is present or used, combination 326 might not be used.

Figure 4:
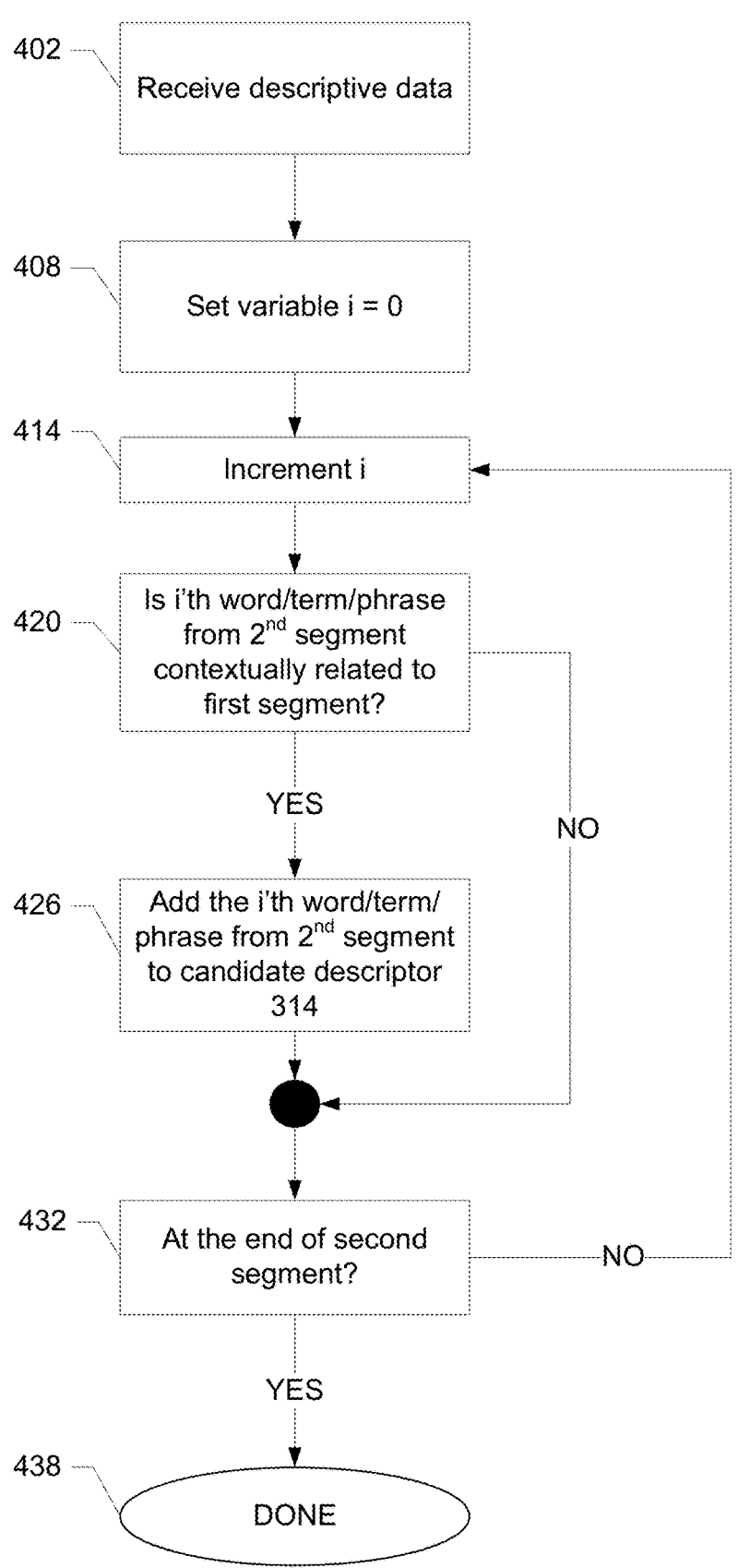
FIGS. 4-6 illustrate example methods demonstrating one or more aspects of this disclosure.
Figure 5:
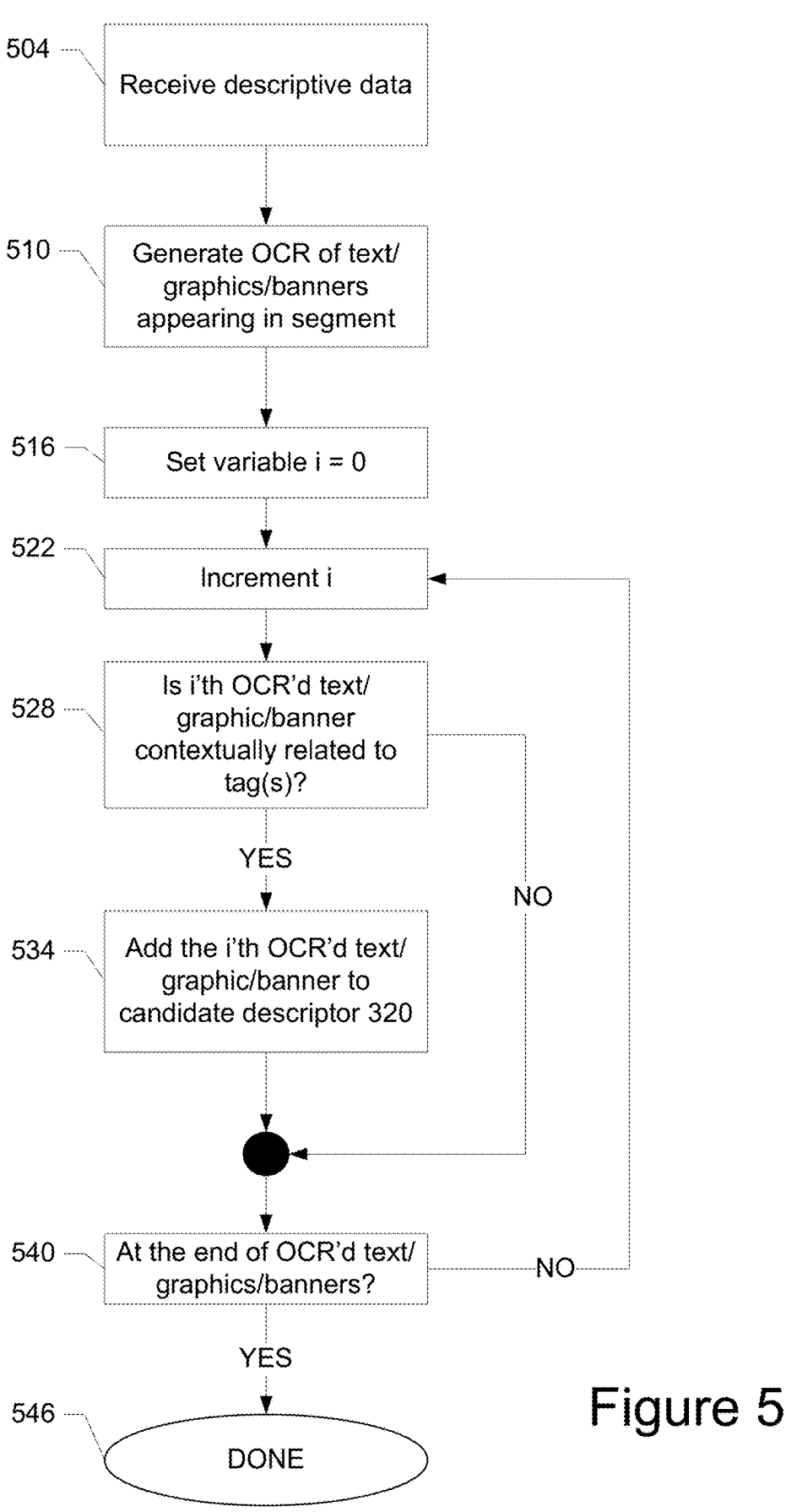
Figure 6:
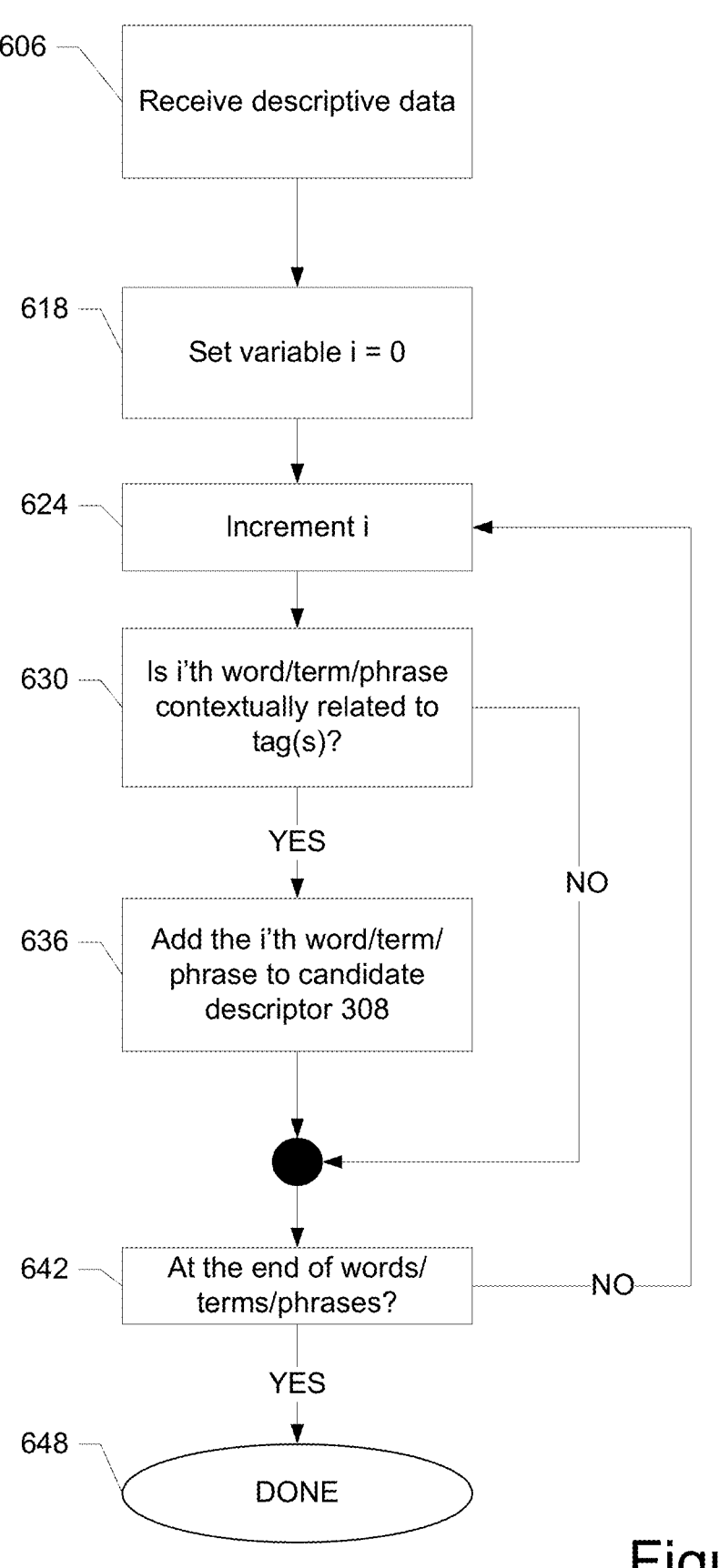

FIGS. 4-6 illustrate methods that may be used in connection with the environments described above in connection with FIGS. 1-3. For convenience, but in a non-limiting manner, the methods of FIGS. 4-6 are described below in connection with the flow of FIG. 3. In some embodiments, the methods of FIGS. 4-6 may execute in connection with detection processes different from those described herein. The FIG. 4 method may result in identifying candidate descriptors based on analysis of a program's transcript to compare words and phrases found on either side of a segment boundary; the FIG. 5 method may result in identifying candidate descriptors based on analysis of a program's video images using optical character recognition (OCR); and the FIG. 6 method may result in identifying candidate descriptors based on comparing a program segment's transcript with tag words received with the transcript.

The method of FIG. 4 may be used as the teaser detection 310, to result in input provided to candidate descriptor(s) 314. In step 402 descriptive data, such as a transcript (e.g., transcript 302) of a video may be received. The descriptive data may correspond to segments of the video, and a portion of the descriptive data corresponding to a first segment of the video may be examined to determine if one or more words, terms, or phrases included therein may serve as a candidate descriptor of a second segment of the video.

In step 408, a variable 'i' may be set to zero for purposes of initialization. In some embodiments, the variable 'i' may correspond to a counter and may be used to iterate over the words, terms, or phrases included in second segment of video. Although not shown in FIG. 4, in some embodiments, a memory or register associated with candidate descriptor(s) 314 may also be cleared in step 408 so as to delete any stale or left-over descriptors from a prior execution of the method.

In step 414, the variable 'i' may be incremented. In regards to the flow from step 408 to step 414, the incrementing of 'i' may correspond to preparing to examine the first word, term, or phrase included in the first segment. In regards to the flow from step 432, the incrementing of 'i' in step 414 may correspond to preparing to examine the next word, term, or phrase included in the first segment.

In step 420, a comparison may be made between the 'i'th word, term, or phrase included in the first segment and the portion of the descriptive data associated with the second segment of video to determine whether the 'i'th word, term, or phrase included in the first segment is contextually related to, or descriptive of, the second segment of video. If it is (e.g., the "YES" path is take out of step 420), then flow may proceed to step 426, where that contextually related word, term or phrase may be provided as candidate descriptor(s) 314, and then the flow may proceed to step 432. If the 'i'th word, term, or phrase included in the first segment is not contextually related to, or descriptive of, the second segment of video (e.g., the "NO" path is taken out of step 420), the flow may proceed to step 432.

In step 432, a determination may be made whether the end (or some other predetermined point) of the first segment has been reached. If the end of the first segment has been reached (e.g., the "YES" path is taken out of step 432), then flow may proceed to step 438 and the method may end. Otherwise, if not at the end of the first segment (e.g., the "NO" path is taken out of step 432), then flow may proceed back to step 414 to increment the variable 'i' in order to prepare to examine whether the next word, term, or phrase included in the first segment is a trailer/descriptor of the second segment of video.

While the method of FIG. 4 was described above as sequencing from the start to the end of the first segment, in some embodiments the sequencing may proceed in a different order. For example, the sequencing may start at the end of the first segment and proceed towards the beginning of the first segment (potentially ending when reaching the start of the first segment, or after some number of words, phrases, or sentences of the first segment have been examined). In some embodiments, multiple segments may be examined.

The method of FIG. 5 may be used as the OCR detection 316, to provide input to candidate descriptor(s) 320. In step 504 descriptive data, such as a transcript (e.g., transcript 302) of a video may be received. The descriptive data may correspond to segments of the video, and a portion of the descriptive data corresponding to a segment of the video may be examined as described below. The descriptive data or the video segments may have one or more assigned or associated tags.

In step 510, the images of a video program may be processed with OCR software to identify text, graphics, and/or banners included in the segment may be subject to an OCR technique or process. The text, graphics, and/or banners may be configured to be displayed when the corresponding video is shown on a display screen or other device.

In step 516, a variable 'i' may be set to zero for purposes of initialization. In some embodiments, the variable 'i' may correspond to a counter and may be used to iterate over the OCR'd text, graphics, banners and the like. Although not shown in FIG. 5, in some embodiments, a memory or register associated with candidate descriptor(s) 320 may be cleared in step 516 so as to delete any stale or left-over descriptors from a prior execution of the method.

In step 522, the variable 'i' may be incremented. In regards to the flow from step 516 to step 522, the incrementing of 'i' may correspond to preparing to examine the first OCR'd text portion, graphic, or banner. In regards to the flow from step 516 to step 522, the incrementing of 'i' may correspond to an increase by a number greater than one. For example, incrementing by more than one may help to ensure that stale graphics/banners from a previous segment are not considered. In regards to the flow from step 540, the incrementing of 'i' in step 522 may correspond to preparing to examine the next OCR'd text portion, graphic, or banner.

In step 528, the 'i'th OCR'd text portion, graphic, or banner may be compared against one or more tags that have been assigned to, or associated with, the segment containing the OCR'd text portion, graphic, or banner. If the 'i'th OCR'd text, graphic, or banner is determined to be contextually related to the tags (e.g., the "YES" path is taken out of step 528), then flow may proceed to step 534 where the 'i'th OCR'd text, graphic, or banner may be provided as candidate descriptor(s) 320. In some embodiments, upon adding the 'i'th OCR'd text, graphic, or banner as a candidate descriptor in connection with step 534, execution of the method of FIG. 5 may end. In some embodiments, the method may continue and flow may proceed from step 534 to step 540 as shown in FIG. 5. If it is determined that the 'i'th OCR'd text, graphic, or banner is not contextually related to the tags (e.g., the "NO" path is taken out of step 528), then flow may proceed to step 540.

In step 540, a determination may be made whether the end (or some other predetermined threshold) of the OCR'd text, graphics, and/or banners has been reached. If the end has been reached (e.g., the "YES" path is taken out of step 540), then flow may proceed to step 546 and the method may end. Otherwise, if not at the end (e.g., the "NO" path is taken out of step 540), then flow may proceed back to step 522 to increment the variable 'i' in order to prepare to examine whether the next OCR'd text portion, graphic, or banner is contextually related to, or descriptive of, the segment.

The method of FIG. 6 may be used as salient tag detection 304 to, e.g., provide input to candidate descriptor(s) 308. In step 606 descriptive data, such as a transcript (e.g., transcript 302) of a video may be received. The descriptive data may correspond to segments of the video, and a portion of the descriptive data corresponding to a segment of the video may be examined to determine if one or more words, terms, or phrases included therein may serve as a candidate descriptor of the same segment. The descriptive data or the video segments may have one or more assigned or associated tags.

In step 618, a variable 'i' may be set to zero for purposes of initialization. In some embodiments, the variable 'i' may correspond to a counter and may be used to iterate over the words, terms, or phrases included in the descriptive data corresponding to the segment being examined. Although not shown in FIG. 6, in some embodiments, a memory or register associated with candidate descriptor(s) 308 may also be cleared in step 618 so as to delete any stale or left-over descriptors from a prior execution of the method.

In step 624, the variable 'i' may be incremented. In regards to the flow from step 618 to step 624, the incrementing of 'i' may correspond to preparing to examine a first word, term, or phrase. In regards to the flow from step 642, the incrementing of 'i' in step 624 may correspond to preparing to examine the next word, term, or phrase.

In step 630, the 'i'th word, term, or phrase may be compared against one or more tags that have been assigned to, or associated with, the segment. If the 'i'th word, term, or phrase is determined to be contextually related to the tags (e.g., the "YES" path is taken out of step 630), then flow may proceed to step 636 where the 'i'th word, term, or phrase may be provided to candidate descriptor(s) 308. In some embodiments, upon adding the 'i'th word, term, or phrase as a candidate descriptor in connection with step 636, execution of the method of FIG. 6 may end. In some embodiments, the method may continue and flow may proceed from step 636 to step 642 as shown in FIG. 6. If it is determined that the 'i'th word, term, or phrase is not contextually related to the tags (e.g., the "NO" path is taken out of step 630), then flow may proceed to step 642.

In step 642, a determination may be made whether the end (or some other predetermined threshold) of the words, terms, and phrases has been reached. If the end has been reached (e.g., the "YES" path is taken out of step 642), then flow may proceed to step 648 and the method may end. Otherwise, if not at the end (e.g., the "NO" path is taken out of step 642), then flow may proceed back to step 624 to increment the variable 'i' in order to prepare to examine whether the next word, term, or phrase is contextually related to, or descriptive of, the segment.

The methods described above in connection with FIGS. 4-6 are illustrative. In some embodiments, some of the steps (or portions thereof) may be optional. Some of the steps (or portions thereof) may be executed in an order or sequence different from that shown. In some embodiments, one or more steps not shown may be included. In some embodiments, thresholds and/or filters may be applied in connection with one or more of the steps described above in order to obtain candidate descriptors having desired characteristics or qualities. In some embodiments, one or more of the methods (or portions thereof) may be combined. For example, the method of FIG. 5 may execute and if the method of FIG. 5 does not generate any results (or results above some threshold value), the method of FIG. 6 may be executed to increase the number of results. Different thresholds or constraints may be used in connection with one or more of the methods.

Figure 7:
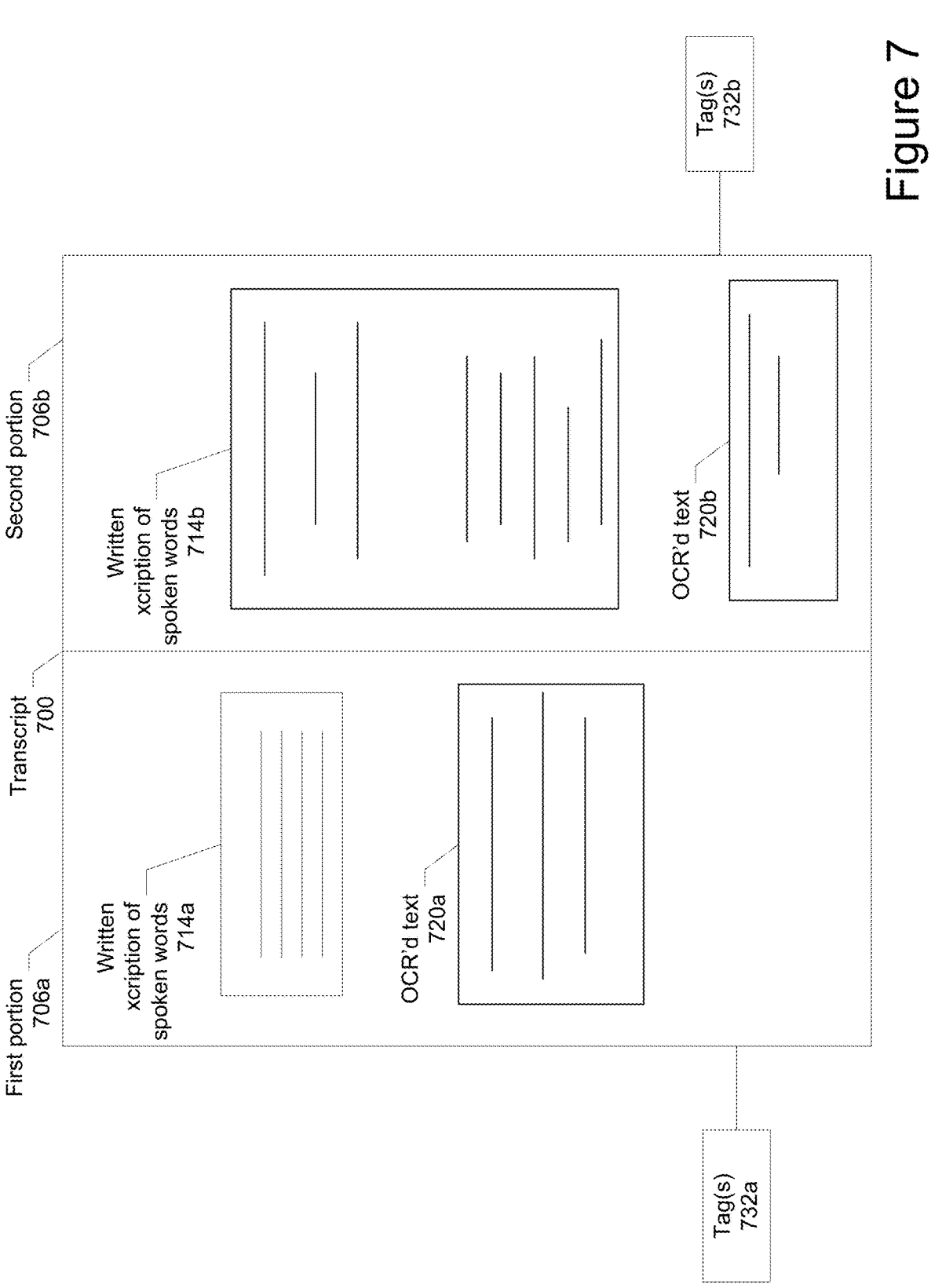
FIG. 7 illustrates an example transcript in accordance with one or more aspects of this disclosure.

FIG. 7 illustrates an example of descriptive data, such as a transcript 700 that may be used in connection with one or more of the methods, flows, or environments described herein. Transcript 700 may correspond to any number of video segments. For illustrative purposes, a first portion 706a of transcript 700 may be associated with a first video segment and a second portion 706b of transcript 700 may be associated with a second video segment. The first and second video segments may be associated with a common show or program, and the transcript 700 may be a closed-captioned textual transcript of the show or program. The program can be segmented in a variety of ways. For example, segments can be time based. The program may have commercial breaks, and the start and end times of the program between commercial breaks can define a segment. Even between commercial breaks, a program can be segmented to identify time ranges where different events occur (e.g., a news program may discuss tax reform in the first 5 minutes of a 10-minute segment between commercials, and then an unsolved crime in the second 5-minutes of the 10-minute segment, and each of those 5-minute portions can be sub-segments within the 10-minute segment). In some embodiments, the segments can be based on lines of dialogue in the transcript. For example, the first 10 lines of dialogue may be associated with the tax reform store, while the next 15 lines of dialogue can contain the discussion of the unsolved crime. These segments may be identified by the program's producers when supplying the program to the system described herein.

First portion 706a may include text 714a corresponding to a written transcription of words spoken during the first segment of the video. First portion 706a may also include OCR'd text 720a corresponding to graphics, banners, and the like shown during the first segment, if the OCR is performed prior to preparation of the transcript. Alternatively, the graphics and banners can simply be part of the video imagery of the show or program, and the OCR can be conducted by the system herein.

Second portion 706b may include text 714b corresponding to a written transcription of words spoken during the second segment of the video. Second portion 706b may include OCR'd text 720*b* corresponding to graphics, banners, and the like shown during the second segment.

Also shown in FIG. 7 are tag(s) 732*a* and 732*b*. Tag(s) 732*a* may be associated with first portion 706*a*. Tag(s) 732*b* may be associated with second portion 706*b*. While shown separately in FIG. 7, on some embodiments, one or more tags (e.g., one or both of tag(s) 732*a* and 732*b*) may be included in a transcript (e.g., transcript 700). In some embodiments, a tag may comprise a selection of keywords that a person (e.g., a show's producer) selected to summarize the contents of a particular segment. A tag may be a one-sentence description that may be used in connection with an electronic program guide (EPG) description of the show, or can be one or more isolated keywords or phrases identifying the subject matter (e.g., racing cars, cooking Alaskan King Crab, etc.).

While some examples have been described above in the context of television technology and communications, aspects of this disclosure may readily be applied to, and adapted to be operative on, one or more other communication systems. Those communication systems may include computer networks, satellite networks, cellular networks, and the like.

Although not required, various aspects described herein may be embodied as a method, a system, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware, and/or hardware. The functionality may be resident in a single computing device or application, or may be distributed across multiple computing devices/platforms or applications, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

The various methods and acts may be operative across one or more computing servers and one or more networks. The functionality may be distributed in any manner, or may be located in a single computing device (e.g., a server, a client computer, etc.). As described herein, a descriptor may be generated and applied to one or more segments of content (e.g., video). The descriptor may be based at least in part on one or more of a teaser, an OCR technique, and a salient word, term, or phrase.

The methodological acts and processes described herein may be tied to particular machines or apparatuses. For example, as described herein, a descriptor may be generated at one or more devices, such as servers and user devices. More generally, one or more apparatuses may include one or more processors and memory storing instructions, that when executed, cause the one or more apparatuses to perform the methodological acts and processes described herein. Furthermore, the methodological acts and processes described herein may perform a variety of functions including transforming an article (e.g., a transcript and a content segment) into a different state or thing (e.g., a content segment with an associated descriptor).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above in any order. It will also be appreciated and understood that modifications may be made without departing from the true spirit and scope of the present disclosure. The description is thus to be regarded as illustrative instead of restrictive on the present disclosure.

What is claimed is:

1. A method comprising:
   receiving, by a computing device, descriptive data associated with:
   a first segment of content, and
   a second segment of the content,
   wherein the descriptive data comprises text associated with a transcription of words;
   comparing, by the computing device and based at least in part on the descriptive data, first segment words and second segment words, wherein the first segment words comprise a plurality of words from the first segment and the second segment words comprise one or more words from the second segment;
   determining, by the computing device, that the first segment words satisfy a threshold distance with respect to a segment boundary, wherein the segment boundary comprises a boundary of a content break prior to the second segment; and
   storing, in memory, based on the comparing, and based on the first segment words satisfying the threshold distance, an indication that the first segment words are descriptive of the second segment.

2. The method of claim 1, further comprising determining that the first segment words are descriptive of the second segment based at least in part on:
   using salient tag detection to detect one or more keywords, and
   a threshold.

3. The method of claim 1, further comprising:
   iteratively comparing the second segment words with a plurality of other words from the first segment;
   determining, based on the iteratively comparing, that one or more of the other words are descriptive of the second segment; and
   based on the one or more of the other words being descriptive of the second segment, determining the one or more of the other words as a candidate descriptor of the second segment.

4. The method of claim 1, wherein the descriptive data comprises a transcript that is associated with at least:
   the first segment,
   the second segment, and
   a third segment of the content,
   the method further comprising:
   comparing third segment words with the second segment words, wherein the third segment words comprise one or more words included in the third segment;

determining that the third segment words are descriptive of the second segment; and based on determining that the third segment words are descriptive of the second segment, determining the third segment words as a candidate descriptor of the second segment.

5. The method of claim 4, further comprising generating, using an Optical Character Recognition technique, the transcript.

6. The method of claim 1, wherein the content break is a commercial break.

7. The method of claim 1, wherein the first segment words comprise at least one of a phrase or a sentence.

8. The method of claim 1, further comprising:

determining a relationship strength between a portion of the descriptive data for the first segment and descriptive data for one or more additional segments within a threshold proximity to the first segment; and determining the first segment words based on the relationship strength being below a maximum threshold.

9. The method of claim 1, wherein the first segment is a teaser for the second segment.

10. A method comprising:

receiving, by a computing device, a transcript for at least:
    a first segment of content, and
    a second segment of the content;

comparing, by the computing device and based at least in part on the transcript, first segment words with second segment words, wherein the first segment words comprise a plurality of words from the first segment and the second segment words comprise one or more words from the second segment;

determining, by the computing device, that the first segment words satisfy a threshold distance with respect to a segment boundary, wherein the segment boundary comprises a boundary of a content break prior to the second segment; and storing, in memory, based on the comparing, and based on the first segment words satisfying the threshold distance, an indication that the first segment words are a candidate descriptor for the second segment.

11. The method of claim 10, further comprising determining the indication based at least in part on:

using salient tag detection to detect one or more keywords, and a threshold.

12. The method of claim 10, further comprising:

iteratively comparing the second segment words with a plurality of other words from the first segment;

determining, based on the iteratively comparing, that one or more of the other words are descriptive of the second segment; and determining, based on the one or more of the other words being descriptive of the second segment, the one or more of the other words as a second candidate descriptor of the second segment.

13. The method of claim 10, further comprising:

comparing third segment words with the second segment words, wherein the third segment words comprise one or more words included in a third segment;

determining that the third segment words are descriptive of the second segment; and based on the determining that the third segment words are descriptive of the second segment, determining the third segment words as a second candidate descriptor of the second segment.

14. The method of claim 10, wherein the content break is a commercial break.

15. The method of claim 10, wherein the first segment words comprise at least one of a phrase or a sentence, and further comprising determining the indication based at least in part on the first segment being longer than a threshold.

16. The method of claim 10, further comprising:

determining a relationship strength between a portion of the transcript for the first segment and one or more additional segments within a threshold proximity to the first segment; and determining the first segment words based on the relationship strength being below a maximum threshold.

17. The method of claim 10, wherein the first segment is a teaser for the second segment.

18. A method comprising:

receiving, by a computing device, descriptive data associated with:
    a first segment of content, and
    a second segment of the content,
    wherein the descriptive data comprises text associated with a transcription of words;

determining, by the computing device and based at least in part on the descriptive data, a relationship strength based on comparing first segment words with second segment words, wherein the first segment words comprise a plurality of words from the first segment and the second segment words comprise one or more words from the second segment;

determining, by the computing device, that the first segment words satisfy a threshold distance with respect to a segment boundary, wherein the segment boundary comprises a boundary of a content break prior to the second segment; and storing, in memory, based on the relationship strength satisfying a threshold, and based on the first segment words satisfying the threshold distance, an indication that the first segment words are descriptive of the second segment.

19. The method of claim 18, wherein the descriptive data comprises a transcript, and further comprising:

receiving, by the computing device, a tag assigned to the content;

iteratively comparing, by the computing device, the transcript and the tag; and determining, by the computing device, and based on the iteratively comparing, whether to add one or more words of the transcript to a candidate descriptor for the content.

20. The method of claim 18, wherein the first segment is a teaser for the second segment.

* * * * *